United States Patent
Tokunaga et al.

(10) Patent No.: US 10,522,961 B2
(45) Date of Patent: Dec. 31, 2019

(54) WIRING HARNESS EVALUATION APPARATUS

(71) Applicant: DENSO CORPORATION, Kariya, Aichi-pref. (JP)

(72) Inventors: Tomoya Tokunaga, Kariya (JP); Hidetoshi Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 628 days.

(21) Appl. No.: 14/293,042

(22) Filed: Jun. 2, 2014

(65) Prior Publication Data
US 2014/0352142 A1    Dec. 4, 2014

(30) Foreign Application Priority Data

Jun. 3, 2013 (JP) .................................. 2013-117192

(51) Int. Cl.
*B60R 16/02*    (2006.01)
*H01R 43/28*    (2006.01)

(52) U.S. Cl.
CPC ......... *H01R 43/28* (2013.01); *B60R 16/0207* (2013.01); *Y10T 29/53213* (2015.01)

(58) Field of Classification Search
CPC ............... H01R 43/28; B60R 16/0207; Y10T 29/53213; H05K 13/08; H05K 13/0882
USPC ............................. 29/748, 729, 745, 745.739
See application file for complete search history.

(56) References Cited

U.S. PATENT DOCUMENTS

| | | | | |
|---|---|---|---|---|
| 5,153,839 A | * | 10/1992 | Cross | G05B 19/41835 29/33 M |
| 6,457,165 B1 | * | 9/2002 | Ishikawa | G06F 17/509 174/72 A |
| 6,549,906 B1 | * | 4/2003 | Austin | G06F 16/258 |
| 8,428,154 B2 | * | 4/2013 | Ishiko | H04B 3/544 375/257 |
| 8,683,421 B2 | * | 3/2014 | Funakoshi | G01R 31/021 716/126 |

(Continued)

FOREIGN PATENT DOCUMENTS

| | | |
|---|---|---|
| JP | 2009211351 A | 9/2009 |
| JP | 2011-210174 A | 10/2011 |
| WO | 2010-073313 A1 | 7/2010 |

OTHER PUBLICATIONS

Office Action dated Apr. 28, 2015 in corresponding JP application No. 2013-117192 (English translation attached).

*Primary Examiner* — Peter Dungba Vo
*Assistant Examiner* — Kaying Kue
(74) *Attorney, Agent, or Firm* — Posz Law Group, PLC

(57) ABSTRACT

A wiring harness evaluation apparatus includes a functional allocation means which allocates functions realized by a plurality of ECUs installed in a vehicle to the ECUs, a routing path setting means which sets a routing path of a wiring harness in conformity with the allocation by the functional allocation means, a component selection means which selects components for configuring the wiring harness in conformity with the routing path set by the routing path setting means, and an evaluation value calculation means which calculates an evaluation value for at least one of a total weight of the components, total cost of the components, and total length of electric wires configuring the wiring harness on the basis of information on the components selected by the component selection means.

9 Claims, 6 Drawing Sheets

(56) References Cited

U.S. PATENT DOCUMENTS

| | | | | |
|---|---|---|---|---|
| 8,782,525 B2* | 7/2014 | Curtis | ................ | G06F 17/5077 |
| | | | | 715/735 |
| 8,823,386 B2* | 9/2014 | Funakoshi | ........... | G01R 31/026 |
| | | | | 324/543 |
| 9,272,674 B2* | 3/2016 | Sasaki | ................ | G01R 31/045 |
| 9,435,843 B2* | 9/2016 | Sasaki | ................ | G01R 31/021 |
| 2010/0010702 A1* | 1/2010 | Gilbert | ..................... | G06N 5/04 |
| | | | | 701/31.4 |
| 2011/0245934 A1 | 10/2011 | Yasuda | | |
| 2013/0061197 A1* | 3/2013 | Funakoshi | ........... | G01R 31/021 |
| | | | | 716/136 |
| 2014/0210258 A1* | 7/2014 | Guering | ............... | H05K 7/1439 |
| | | | | 307/9.1 |
| 2014/0350911 A1* | 11/2014 | Tokunaga | ............... | B62D 65/00 |
| | | | | 703/21 |

* cited by examiner

WIRING HARNESS EVALUATION APPARATUS

CROSS-REFERENCE TO RELATED APPLICATION

This application is based on and claims the benefit of priority from earlier Japanese Patent Application No. 2013-117192 filed Jun. 3, 2013, the description of which is incorporated herein by reference.

BACKGROUND

Technical Field

The present invention relates to a wiring harness evaluation apparatus used in designing vehicles.

Related Art

In designing a vehicle, a computer is used to evaluate a wiring harness. For example, a patent document JP-A-2011-210174 discloses a technique of the evaluation. According to the technique, a path of a wiring harness is determined from the locations of the electronic control units (ECUs) in the vehicle. Further, various components (e.g., electric wires, connectors, tubes, etc.) necessary for designing the wiring harness are selected based on the information on the wiring path (e.g., temperatures, waterproofed/non-waterproofed, etc.) and the information on the ECUs (e.g., rated current) as objects to be connected. Then, the cost and weight of the components and the length of the wiring of the wiring harness are evaluated.

The design of a wiring harness greatly depends on the functional allocation of ECUs. However, in the conventional art as set forth above, the evaluation of a wiring harness is based on an idea that the functional allocation of ECUs has a generally-known pattern. Therefore, this raises a problem that optimum results will not be necessarily derived from the evaluation.

SUMMARY

An embodiment provides a wiring harness evaluation apparatus that enables evaluation of a wiring harness with a view to the functional allocation of ECUs.

An embodiment provides a wiring harness evaluation apparatus. The apparatus includes: a functional allocation means which allocates functions realized by a plurality of ECUs installed in a vehicle to the ECUs; a routing path setting means which sets a routing path of a wiring harness in conformity with the allocation by the functional allocation means; a component selection means which selects components for configuring the wiring harness in conformity with the routing path set by the routing path setting means; and an evaluation value calculation means which calculates an evaluation value for at least one of a total weight of the components, total cost of the components, and total length of electric wires configuring the wiring harness on the basis of information on the components selected by the component selection means.

DETAILED DESCRIPTION OF THE PREFERRED EMBODIMENTS

With reference to the accompanying drawings, hereinafter are described some embodiments of the present invention.

First Embodiment

<General Configuration>

Figure 1:
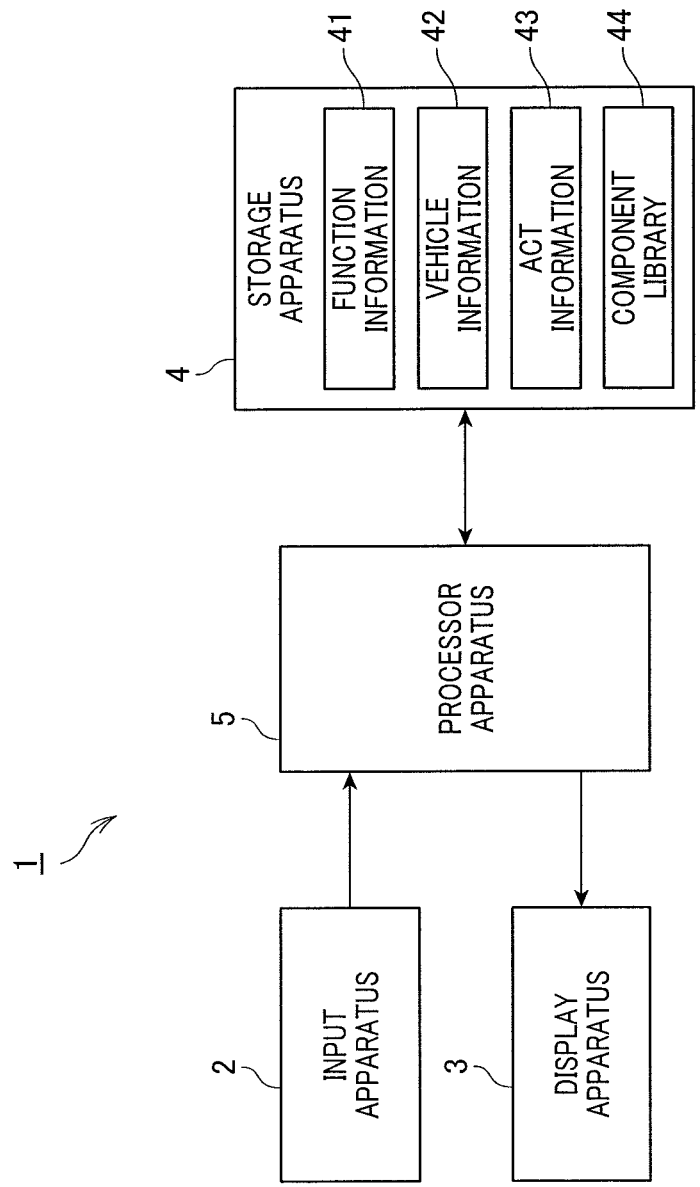
FIG. 1 is a block diagram illustrating a general configuration of a wiring harness evaluation apparatus.

Referring to FIGS. 1 to 4, a first embodiment will be described. FIG. 1 is a block diagram illustrating a general configuration of a wiring harness evaluation apparatus 1 according to the first embodiment. As shown in FIG. 1, the wiring harness evaluation apparatus 1 includes an input apparatus 2, display apparatus 3, storage apparatus 4 and processor apparatus 5.

The input apparatus 2 is configured by a keyboard, a pointing device, or the like, and is used for inputting various instructions or pieces of information for operating the apparatus. The input apparatus 2 may include a communication interface for enabling the apparatus to directly communicate or indirectly communicate via a network with different equipment (e.g. computer or measuring equipment), and a reader for reading information from various storage media, so that necessary information is inputted to the apparatus via the communication interface and the reader.

The display apparatus 3 is configured by a liquid crystal display, or the like, and displays, for example, an entry screen for entering various pieces of information via the input apparatus 2, or a results screen for showing the results of the processing performed by the processor apparatus 5. The input apparatus 2 and the display apparatus 3 may be integrally provided in the form such as of a display having a touch panel.

The storage apparatus 4 is configured by a storage medium, such as a hard disc or a USB (universal serial bus) thumb drive, that stores various pieces of information used for the processing performed by the processor apparatus 5 (described later). The information stored in the storage apparatus 4 may be externally retrieved or may be updated via the input apparatus 2. Alternatively, if the storage apparatus 4 is configured by a detachable storage medium, the information may be updated by changing the storage medium.

The processor apparatus 5 is configured by a known computer mainly including CPU, ROM and RAM. The processor apparatus 5 at least performs a wiring harness evaluation process, covering the functional allocation of ECUs, in accordance with various instructions or various pieces of information inputted via the input apparatus 2 and various pieces of information stored in the storage.

<Information Stored in Storage>

The storage apparatus 4 at least stores function information 41, vehicle information 42, ACT (actuator) information 43 and a component library 44. Hereinafter, each function that can be allocated to an ECU is referred to as a unit function.

The function information 41 is prepared for each unit function and includes various pieces of information (e.g., the mounting area of the actuator and sensor for realizing the unit function, and the mounting area of the drive circuit of the actuator and sensor) for specifying the size necessary for mounting the corresponding unit function (for specifying the mounting area on a base plate).

Figure 2:
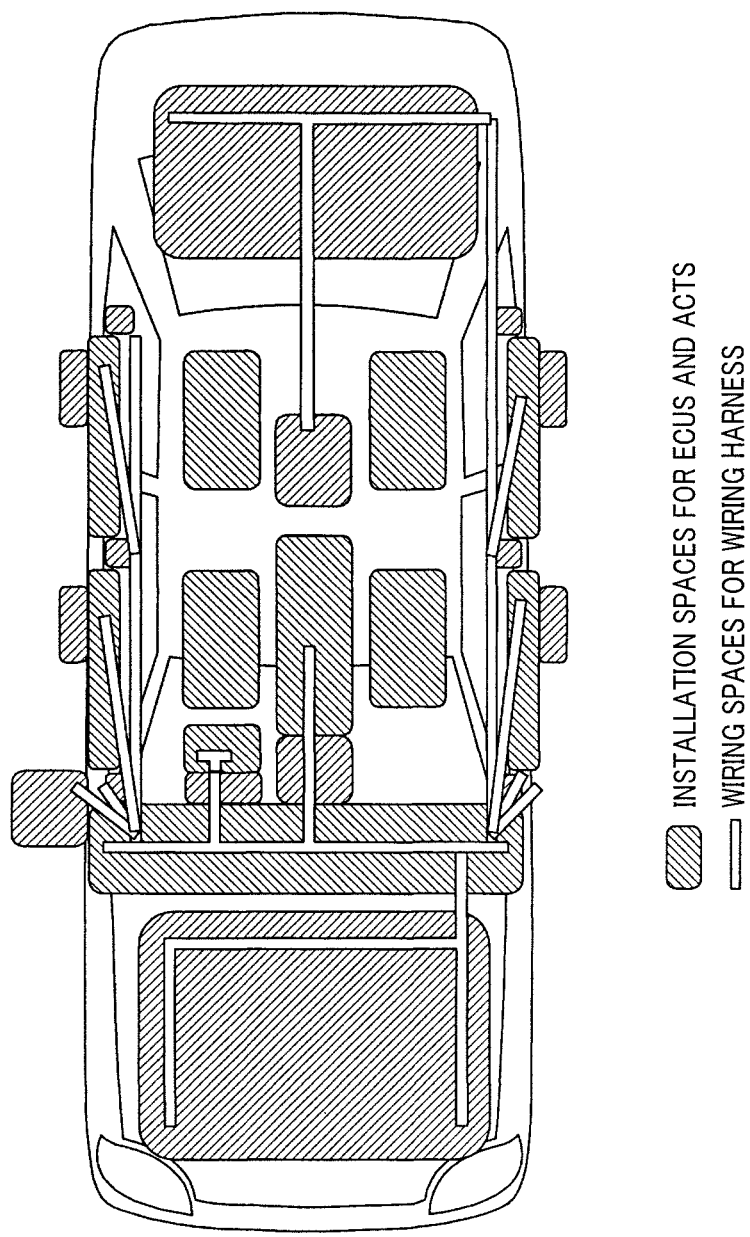
FIG. 2 is a diagram illustrating installation spaces and wiring spaces.

The vehicle information 42 is prepared for each type of vehicle. Specifically, the vehicle information 42 includes the number of ECUs installed in the vehicle, information regarding installation spaces (e.g., locations, sizes, availability of waterproofing, and atmosphere temperatures) for the ECUs and the actuators (ACTs) as objects to be controlled by the ECUs, and information regarding wiring spaces (e.g., length of a path, availability of waterproofing, atmosphere temperatures, and positions and sizes of through holes in the path) for the wiring harness that connects between the ECUs and the ATCs. FIG. 2 is a diagram illustrating the installation spaces (hatched portions in FIG. 2) for the ECUs and the ATCs and the wiring spaces (white striped portions that are edged with black lines in FIG. 2).

The ACT information 43 is prepared for each ACT installed in the vehicle. The ACT information 43 includes information that defines electrical specifications, such as an interface (I/F), rated current or rated voltage required for the ECU that uses the corresponding ACT.

The component library 44 includes information prepared for each of components (electric wires, connectors, or components that form an ASSY (assembly) (hereinafter referred to as ASSY components)) configuring a wiring harness. The component library 44 includes information regarding the size, weight, cost and applicable environment (temperature range, waterproofed/non-waterproofed) of each component.

<Wiring Harness Evaluation Process>

Figure 3:
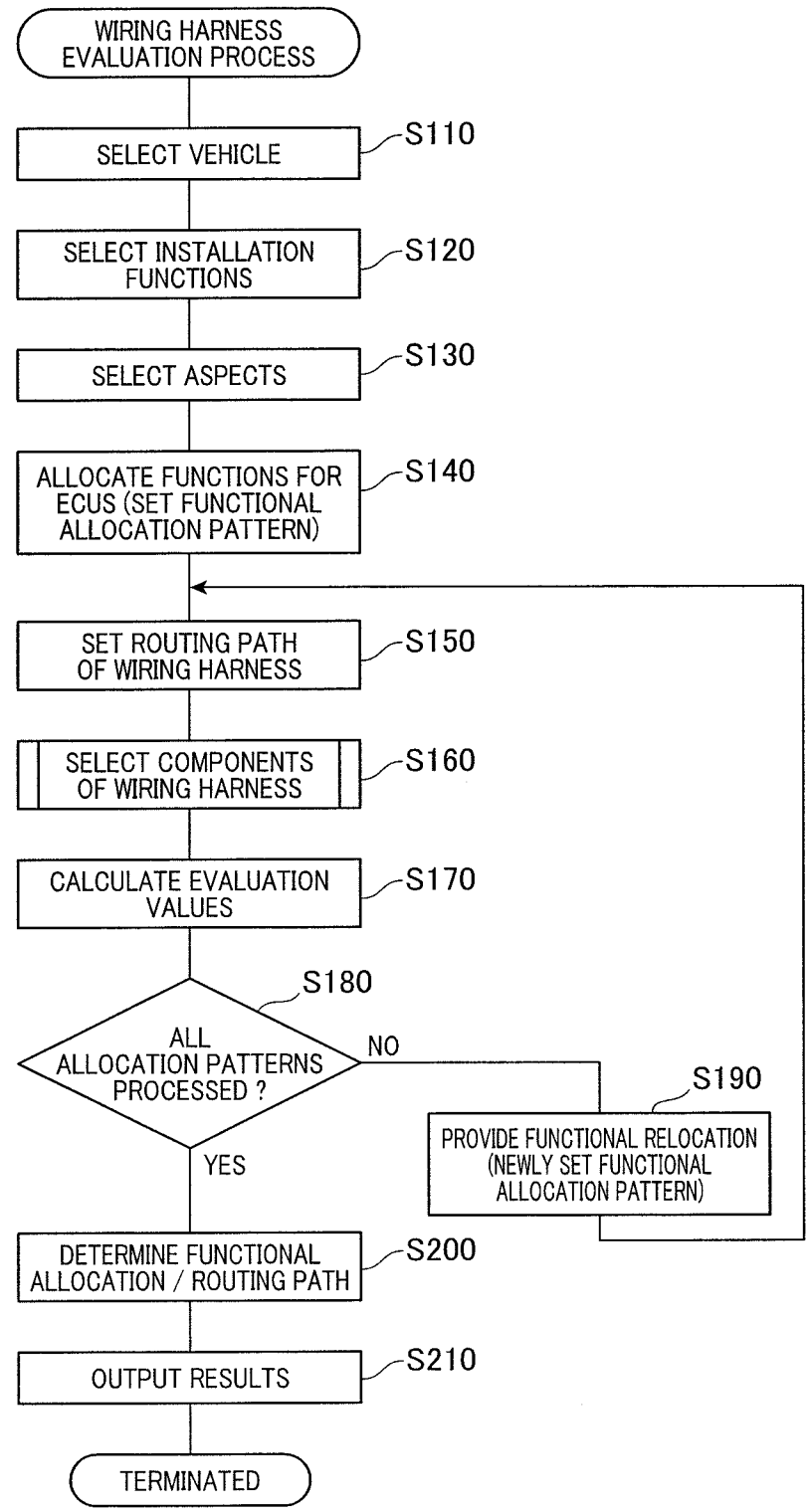
FIG. 3 is a flow diagram illustrating an evaluation process performed by a processor apparatus.

Referring to a flow diagram shown in FIG. 3, hereinafter is described a wiring harness evaluation process performed by the processor apparatus 5. The processor apparatus 5 includes a ROM that stores an evaluation processing program for realizing the wiring harness evaluation process. The wiring harness evaluation process is started upon input of a predetermined startup instruction via the input apparatus 2.

First, the processor apparatus 5 selects an application vehicle that indicates the type of vehicle to which the present process is applied (step S110). Specifically, the processor apparatus 5 shows on the display apparatus 3 a screen for selecting a vehicle, and sets the vehicle that is selected via the input apparatus 2 as an application vehicle.

Then, the processor apparatus 5 selects installation functions that indicate functions to be installed in the application vehicle (step S120). Specifically, the processor apparatus 5 shows on the display apparatus 3 a screen for selecting installation functions, and sets the installation functions that are selected via the input apparatus 2.

Then, the processor apparatus 5 selects an aspect indicating how the wiring harness should be evaluated (step S130). Specifically, the processor apparatus 5 shows on the display apparatus 3 a screen for selecting an aspect, and sets the aspect that is selected via the input apparatus 2. For example, the aspect may be "cost priority", "weight priority" or "number-of-wire priority". A single aspect may be ensured to be selected, or a plurality of aspects may be ensured to be selected with ordering of priority. Alternatively, minimum requirements to be met may be ensured to be set for each item.

Then, the processor apparatus 5 uses the application vehicle selected in step S110 and the installation functions selected in step S120 as bases to set a functional allocation pattern that indicates a functional allocation for the ECUs. At the same time, for each ECU, the processor apparatus 5 calculates the size of the ECU and the electrical specification required for the ECU (e.g., interface, rated current, rated voltage, etc.) in accordance with the set functional allocation pattern (step S140). Specifically, the functional allocation pattern is set in conformity with the number of ECUs shown in the vehicle information 42 related to the application vehicle to appropriately allocate the unit functions selected as the installation functions. The unit functions may be allocated at random or may be allocated with a limitation being imposed by the aspects selected in step S130.

Then, the processor apparatus 5 sets a routing path of the wiring harness in conformity with the functional allocation pattern set in step S140 and the information on the installation spaces and wiring spaces indicated in the vehicle information 42 related to the application vehicle (step S150).

Then, the processor apparatus 5 selects components for configuring the wiring harness in conformity with the routing path set in step S150 (step S160). The components are selected from those which are shown in the component library 44.

Figure 4:
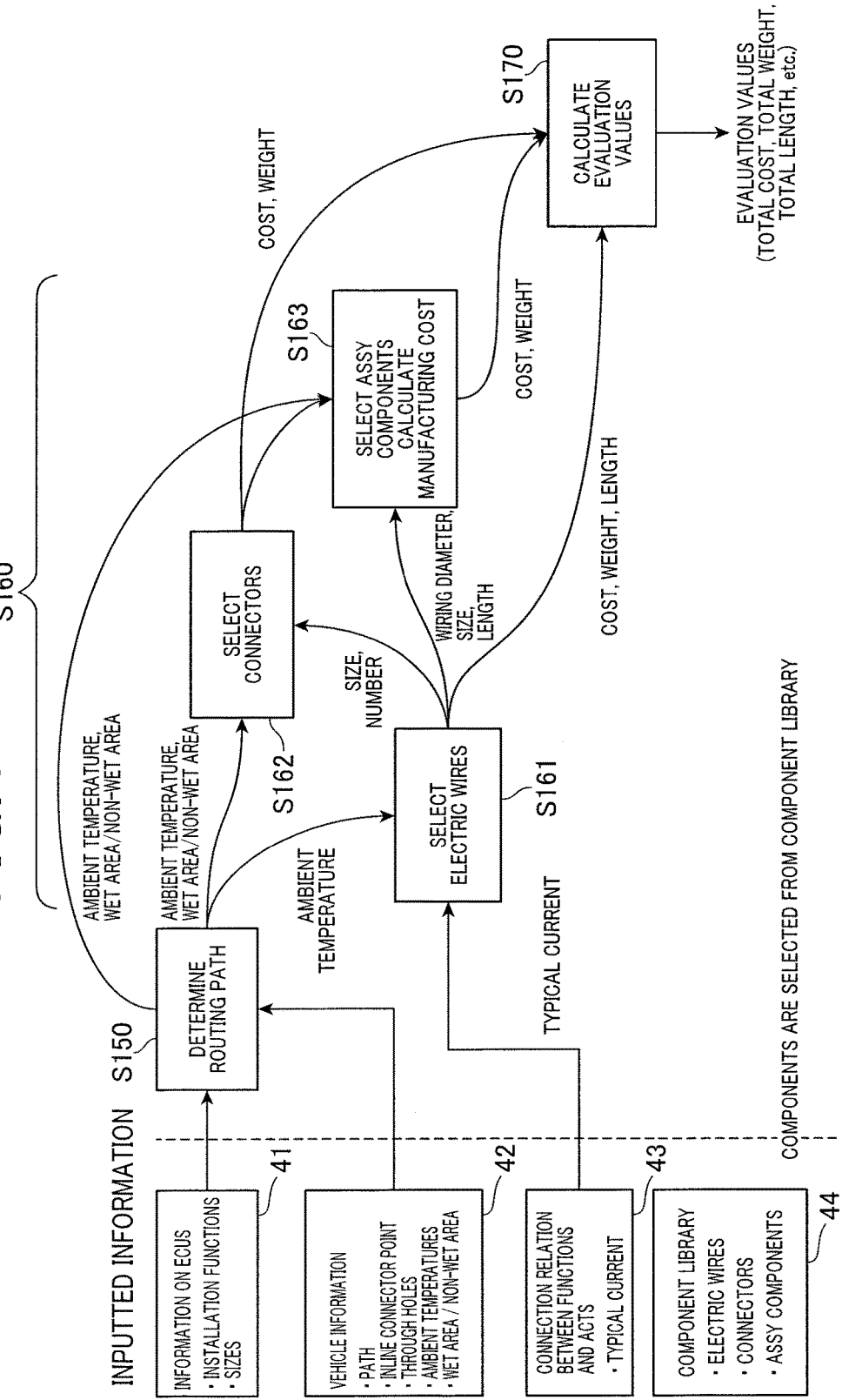
FIG. 4 is a diagram illustrating a relationship between components that are selected through component-selection processing and various pieces of information that are used in selecting the components.

Referring to FIG. 4, an outline of the processing performed in step S160 will be described.

FIG. 4 is a diagram illustrating a relationship between the selected components and various pieces of information used in selecting components. As shown in FIG. 4, the processor apparatus 5 firstly selects electric wires as components configuring the wiring harness (step S161). The electric wires are selected on the basis of the information on the wiring spaces (atmosphere temperatures) related to the routing path set in step S150 and the electrical specification of the ECUs and ACTs as connection destinations of the electric wires (the electrical specification of the ECUs is acquired in step S140 and that of the ACTs is acquired from the ACT information 43).

Then, the processor apparatus 5 selects connectors as the components configuring the wiring harness (step S162). The connectors are selected on the basis of the information on the wiring spaces (atmosphere temperatures and waterproofed/non-waterproofed) related to the routing path set in step S150 and the information on the electric wires (size and number) selected in step S161.

Then, the processor apparatus 5 selects ASSY components as the components configuring the wiring harness (step S163). The ASSY components are selected on the basis of the information on the wiring spaces (atmosphere temperatures and waterproofed/non-waterproofed) related to the routing path set in step S150, the information on the electric wires (thickness, size and length) selected in step S161, and the information on the connectors (number of pins) selected in step S162. In this case, the cost incurred in manufacturing the ASSYs (assemblies) is also calculated.

Referring to FIG. 3 again (as well as FIG. 4), after completing step S160, the processor apparatus 5 calculates evaluation values for evaluating the wiring harness (step S170). The evaluation values are calculated on the basis of the information on the components (electric wires, connectors and ASSY components) selected in step S150 (steps S151 to S155). Specifically, the evaluation values include a total cost (=total cost of components+cost involved in forming ASSYs), a total weight of the components and total length of the electric wires. The evaluation values are specifically calculated on the basis of the information on the electric wires (cost, weight and length of the electric wires) selected in step S161, the information on the connectors (cost and weight of the connectors) selected in step S162, and the information on the ASSY components (cost and weight of the ASSY components and cost involved in forming ASSYs).

Then, the processor apparatus 5 determines whether or not steps S150 to S170 have been performed for all the available functional allocation patterns (step S180). If there is any other available functional allocation pattern (NO in step S180), the processor apparatus 5 sets the available functional allocation pattern as a new functional allocation pattern (step S190). Then, control returns to step S150.

After calculating evaluation values for all the available functional allocation patterns (YES in step S180), the processor apparatus 5 uses, as a basis, the evaluation values of the wiring harness calculated for each functional allocation pattern to determine a best functional allocation (functional allocation pattern) suitable for the aspects selected in step S130 (step S200). In determining the best functional allocation, the processor apparatus 5 calculates an integrated evaluation value for each functional allocation pattern. For example, the integrated evaluation value is calculated by weighting and adding together the evaluation values (total cost, total weight of the components and total length of the electric wires) related to the wiring harness, in accordance with the aspects selected in step S130. Then, the processor apparatus 5 selects a functional allocation pattern having a minimum integrated evaluation value. However, in selecting the functional allocation pattern, the processor apparatus 5 excludes those functional allocation patterns which are unfeasible due to the constraints in terms of wiring space. For example, such an unfeasible functional allocation pattern may include a through hole in the wiring path and the through hole may be allocated with not less than an upper limit number of electric wires tolerable to the through hole.

Finally, the processor apparatus 5 outputs (e.g., shows on the display apparatus 3) the determined functional allocation (functional allocation pattern) and the evaluation values of the wiring harness in respect of the functional allocation (step S210). Then, the present process is terminated.

In the present embodiment, only the functional allocation pattern having a minimum integrated evaluation value is configured to be outputted. However, all functional allocation patterns that meet predetermined requirements may be outputted, for the final determination of the user.

<Advantageous Effects>

As described above, the wiring harness evaluation apparatus 1 can evaluate a wiring harness with a view to the functional allocation of the ECUs, or specify a favorable functional allocation of the ECUs from a standpoint of designing a wiring harness. Accordingly, time and effort involved in designing a wiring harness is reduced.

Further, according to the wiring harness evaluation apparatus 1, all the available functional allocation patterns are compared to each other. Such a comparison leads to selecting a functional allocation pattern that optimizes the evaluation values of the wiring harness.

Second Embodiment

Figure 5:
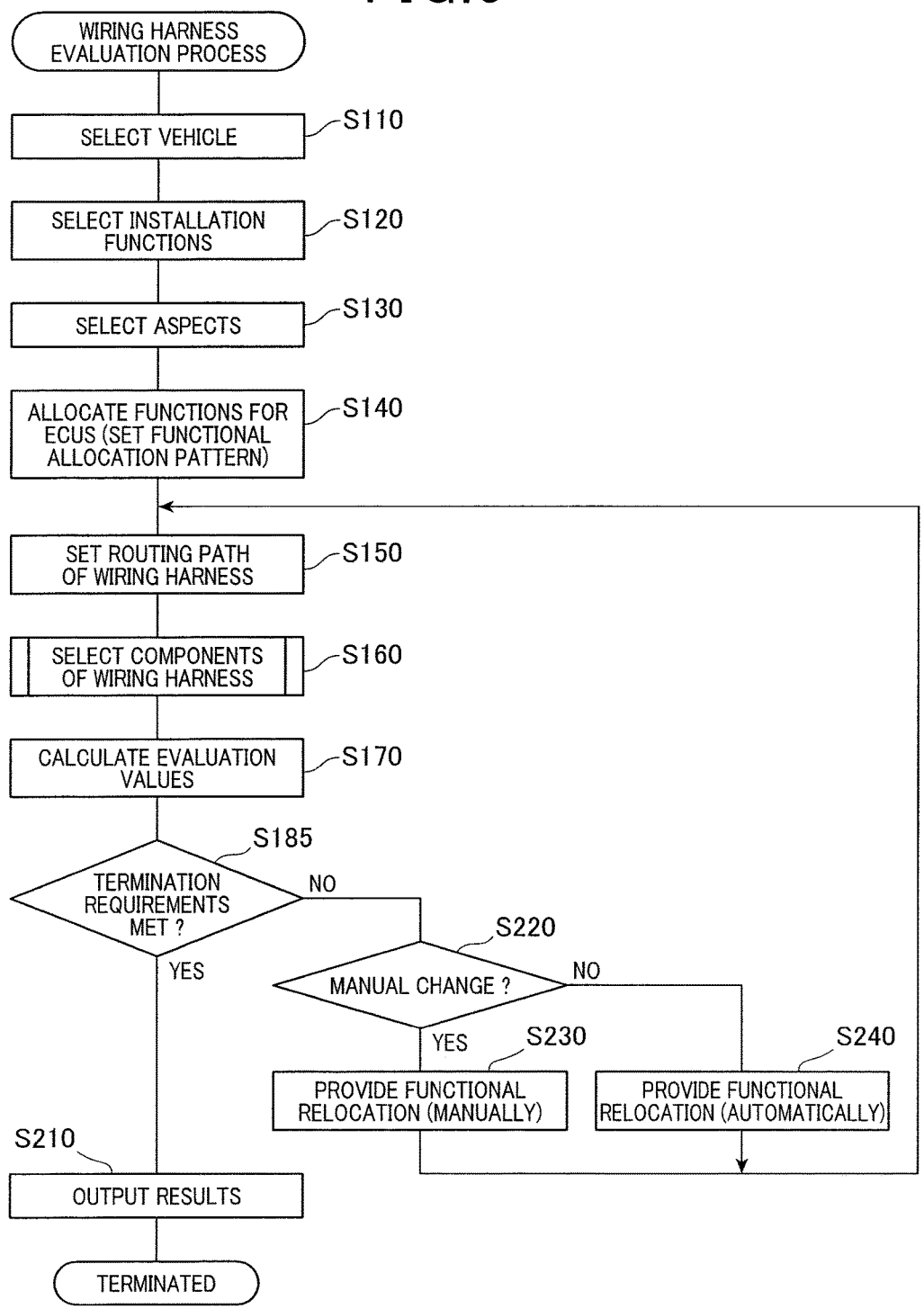
FIG. 5 is a flow diagram illustrating an evaluation process, according to a second embodiment.
Figure 6:
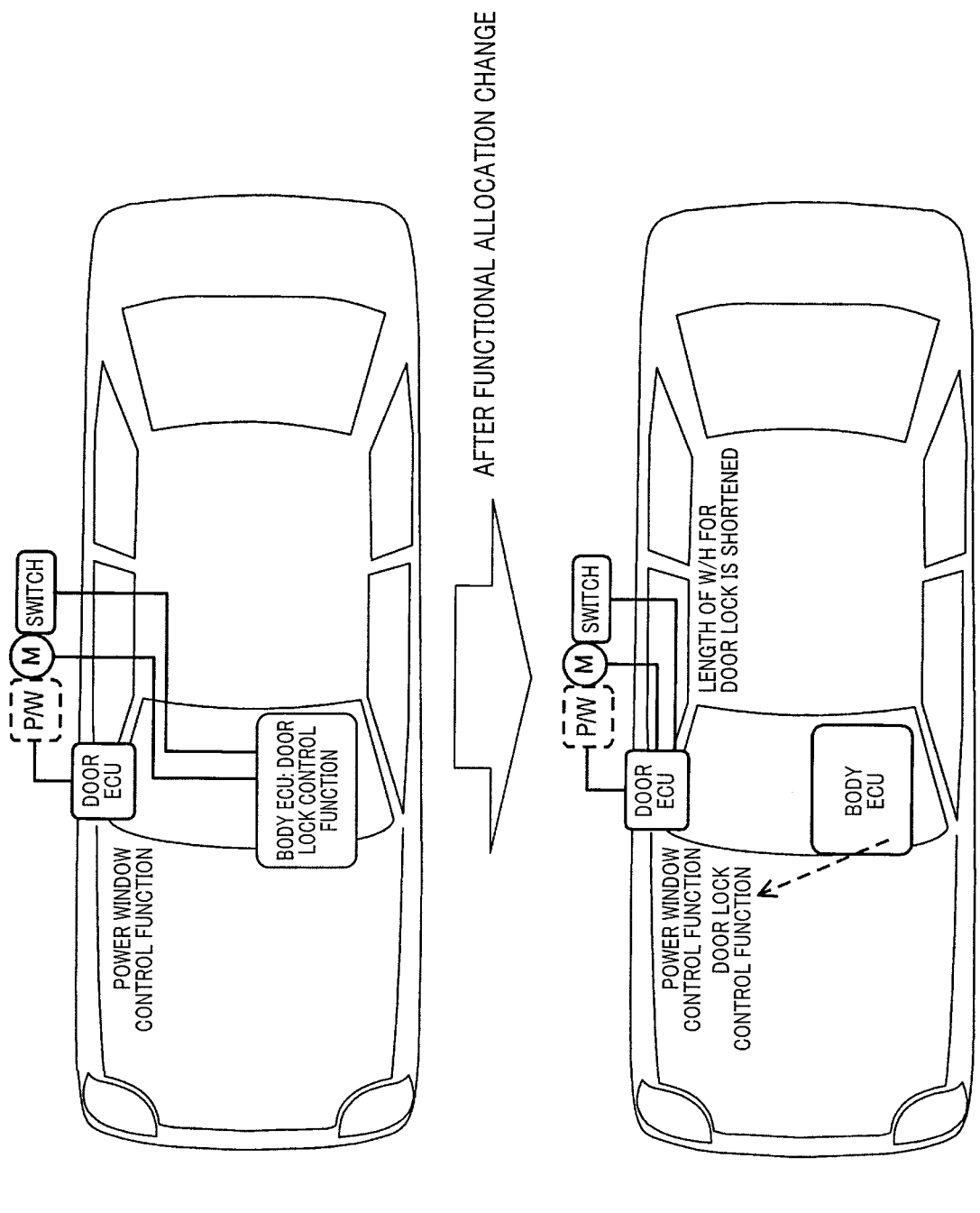
FIG. 6 is a diagram illustrating an example of a relocation algorithm and effects thereof.

Referring now to FIGS. 5 and 6, a second embodiment of the present invention is described.

In the second embodiment, the components identical with or similar to those in the first embodiment are given the same reference numerals for the sake of omitting unnecessary explanation. The second embodiment is only partially different from the first embodiment in the wiring harness evaluation process performed by the processor apparatus 5. The following description is provided focusing on the difference.

<ECU Evaluation Process>

FIG. 5 is a flow diagram illustrating an evaluation process, according to the second embodiment. As shown in FIG. 5, steps S110 to S170 are the same as those of the first embodiment.

Accordingly, up until step S170, the processor apparatus 5 calculates evaluation values of the wiring harness in respect of the set functional allocation pattern. Then, the processor apparatus 5 determines whether or not the evaluation values meet termination requirements set in advance (step S185). The termination requirements are the ones that have been set in accord with the aspects selected in step S130. Specifically, for example, the processor apparatus 5 calculates, as described in step S200, an integrated evaluation value using a weight which is suitable for the aspects. When the integrated evaluation value is not more than the tolerable upper limit set in advance, it is determined that the termination requirements have been met. However, the termination requirements are not limited to these. For example, the processor apparatus 5 may make a determination depending on whether all the items (total cost, total weight of the components and total length of the electric wires) of the evaluation values meet minimum requirements that have been set in advance for the individual items.

If the evaluation values are determined to meet the terminal requirements (YES in step S185), the processor apparatus 5 outputs the currently set functional allocation pattern together with the evaluation values of the wiring harness (step S210). Then, the present process is terminated.

If the termination requirements are determined not to be met (NO in step S185), the processor apparatus 5 determines whether or not the functional allocation pattern should be manually changed (step S220). For example, whether the manual change should be conducted may be determined through a separately conducted initial setting, or may be selected by the user every time the necessity arises via an inquiry screen shown on the display apparatus 3.

If the manual change is conducted (YES in step S220), the processor apparatus 5 performs processing to manually realize a functional relocation (step S230). Then, the control returns to step S150. Specifically, the processor apparatus 5 performs processing of showing a functional allocation change screen on the display apparatus 3 and having a new functional allocation pattern inputted via the input apparatus 2.

If the manual change is not conducted (NO at step S220), the processor apparatus 5 performs processing to automatically realize a functional relocation (step S240). Then, the control returns to step S150. Specifically, a functional allocation pattern is set in accordance with a relocation algorithm prepared in advance for each of the aspects.

Let us take as an example of using a relocation algorithm in a case where two functions (or a function and an actuator) requiring signal transmission/reception therebetween are arranged being distanced from each other. In this case, the functions may be relocated so that the wiring path will become shorter (see FIG. 6), or the functions may be integrated into a single ECU according to the relocation algorithm. The length of the wiring path or the number of electric wires can be reduced.

FIG. 6 is a diagram illustrating an example of the relocation algorithm and effects thereof. In the example shown in FIG. 6, a function 1 (power window controller) and a function 2 (door lock controller) are initially allocated to a door ECU and a body ECU, respectively. As a result of a functional relocation, the location of the function 2 has been changed from the body ECU to the door ECU. Thus, the length of the wiring path of the electric wires is reduced in terms of a distance between the ECU and the motor and between the ECU and the switch.

Advantageous Effects

Similar to the first embodiment, the present embodiment can evaluate a wiring harness, taking account of the functional allocation of the ECUs, or specify a favorable functional allocation of the ECUs in light of the design of the wiring harness. Accordingly, time and effort involved in designing a wiring harness is reduced.

According to the present embodiment, functional allocation patterns are evaluated one by one and, at the point when the one that meets the terminal requirements is found, the process is terminated. Thus, the time taken for obtaining the results is shortened.

Other Embodiments

Some embodiments of the present invention have so far been described. However, the present invention shall not be limited to the foregoing embodiments but may, as a matter of course, be implemented in various modes. For example, the function of a single component may be separated to a plurality of components, or the functions of a plurality of components may be integrated into a single component. Alternatively, at least a part of the configuration of each of the foregoing embodiments may be replaced by a well-known configuration having the similar functions.

Hereinafter, aspects of the above-described embodiments will be summarized.

The wiring harness evaluation apparatus includes a functional allocation means (S140, S180, S190, S185, S220 to S240), a routing path setting means (S150), a component selection means (S160), and an evaluation value calculation means (S170). The functional allocation means allocates functions realized by a plurality of ECUs installed in a vehicle to the ECUs. The routing path setting means (S150) which sets a routing path of a wiring harness in conformity with the allocation by the functional allocation means. The component selection means selects components for configuring the wiring harness in conformity with the routing path set by the routing path setting means. The evaluation value calculation means calculates an evaluation value for at least one of a total weight of the components, total cost of the components, and total length of electric wires configuring the wiring harness on the basis of information on the components selected by the component selection means.

According to this configuration, evaluation values of a wiring harness are calculated in respect of an optional functional allocation. Then, based on the evaluation values, the wiring harness can be evaluated covering the functional allocation of the ECUs.

What is claimed is:

1. A wiring harness evaluation apparatus, comprising:
an electronic storage that electronically stores control information on a plurality of electronic control units (ECUs) disposed in a vehicle;
a processor apparatus, including a central processing unit, a random access memory, and a read only memory, which is embodied as:
a functional allocation means which allocates, based on a priority scheme and according to the control information, a plurality of functions that will be realized by the plurality of ECUs;
a routing path setting means which sets a routing path of a wiring harness in the vehicle in conformity with the allocation by the functional allocation means;
a component selection means which selects components, including electric wires, and connectors, for configuring the wiring harness in conformity with the routing path set by the routing path setting means; and
an evaluation value calculation means which calculates an evaluation value for at least one of a total weight of the components, total cost of the components, and total length of electric wires configuring the wiring harness on the basis of information on the components selected by the component selection means, wherein
the priority scheme, by which the functional allocation means allocates the plurality of functions, is selected by user input.

2. The wiring harness evaluation apparatus according to claim 1, wherein
the functional allocation means reallocates functions if the evaluation value calculated by the evaluation value calculation means does not meet a predetermined requirement.

3. The wiring harness evaluation apparatus according to claim 1, wherein
the functional allocation means sets a plurality of types of functional allocations, and
the evaluation value calculation means calculates the evaluation value in respect of each of the set functional allocations.

4. The wiring harness evaluation apparatus according to claim 1, further comprising:
an aspect selection means which selects an aspect used for evaluating a functional allocation for the ECUs; and
an evaluation means which calculates an integrated evaluation value by weighting and adding together a plurality of evaluation values calculated by the evaluation value calculation means in accordance with the aspect selected by the aspect selection means, to evaluate the functional allocation.

5. The wiring harness evaluation apparatus according to claim 4, wherein
the functional allocation means limits the allocation of the functions in accordance with the aspect selected by the aspect selection means.

6. A wiring harness evaluation apparatus, comprising:
an electronic storage that electronically stores control information on a plurality of electronic control units (ECUs) disposed in a vehicle;
a processor apparatus, including a central processing unit, a random access memory, and a read only memory, which is embodied as:

a functional allocation means which allocates, based on a priority scheme and according to the control information, a plurality of functions that will be realized by the plurality of ECUs;

a routing path setting means which sets a routing path of a wiring harness in the vehicle in conformity with the allocation by the functional allocation means;

a component selection means which selects components, including electric wires, and connectors, for configuring the wiring harness in conformity with the routing path set by the routing path setting means; and an evaluation value calculation means which calculates an evaluation value for at least one of a total weight of the components, total cost of the components, and total length of electric wires configuring the wiring harness on the basis of information on the components selected by the component selection means, wherein:

the priority scheme includes at least one of cost priority, weight priority, and number-of-wire priority; and the wiring harness evaluation apparatus further comprises:

an aspect selection means which selects an aspect used for evaluating a functional allocation for the ECUs; and an evaluation means which calculates an integrated evaluation value by weighting and adding together a plurality of evaluation values calculated by the evaluation value calculation means in accordance with the aspect selected by the aspect selection means, to evaluate the functional allocation.

7. The wiring harness evaluation apparatus according to claim 6, wherein the functional allocation means limits the allocation of the functions in accordance with the aspect selected by the aspect selection means.

8. A wiring harness evaluation apparatus, comprising:

an electronic storage that electronically stores control information on a plurality of electronic control units (ECUs) disposed in a vehicle;

a processor apparatus, including a central processing unit, a random access memory, and a read only memory, which is embodied as:

a functional allocation means which allocates, based on a priority scheme and according to the control information, a plurality of functions that will be realized by the plurality of ECUs;

a routing path setting means which sets a routing path of a wiring harness in the vehicle in conformity with the allocation by the functional allocation means;

a component selection means which selects components, including electric wires, and connectors, for configuring the wiring harness in conformity with the routing path set by the routing path setting means; and an evaluation value calculation means which calculates an evaluation value for at least one of a total weight of the components, total cost of the components, and total length of electric wires configuring the wiring harness on the basis of information on the components selected by the component selection means, wherein:

the control information on the plurality of ECUs includes the number of ECUs installed in the vehicle and information regarding installation spaces, including one or more of locations, sizes, availability of waterproofing, and atmosphere temperatures, for the ECUs; and the wiring harness evaluation apparatus further comprises:

an aspect selection means which selects an aspect used for evaluating a functional allocation for the ECUs; and an evaluation means which calculates an integrated evaluation value by weighting and adding together a plurality of evaluation values calculated by the evaluation value calculation means in accordance with the aspect selected by the aspect selection means, to evaluate the functional allocation.

9. The wiring harness evaluation apparatus according to claim 8, wherein the functional allocation means limits the allocation of the functions in accordance with the aspect selected by the aspect selection means.

\* \* \* \* \*